(12) United States Patent
Beneke et al.

(10) Patent No.: US 6,825,854 B1
(45) Date of Patent: Nov. 30, 2004

(54) METHOD FOR IMAGE MANAGEMENT OF X-RAY IMAGES

(75) Inventors: Knut Beneke, Ober-Olm (DE); Stefan Ullrich, Saarbrü cken (DE)

(73) Assignee: Heimann Systems GmbH, Wiesbaden (DE)

(*) Notice: Subject to any disclaimer, the term of this patent is extended or adjusted under 35 U.S.C. 154(b) by 0 days.

(21) Appl. No.: 09/496,214

(22) Filed: Feb. 1, 2000

(30) Foreign Application Priority Data

Sep. 9, 1999 (DE) ......................................... 199 43 213

(51) Int. Cl.[7] .............................. G09G 5/00; G06K 9/00
(52) U.S. Cl. ....................... 345/619; 345/660; 345/661; 345/670; 345/838; 345/547; 382/132
(58) Field of Search ................................. 345/619, 660, 345/661, 670, 676, 838, 501, 530, 531, 547, 549, 555–556, 629, 502; 707/101, 103, 104; 705/2, 3; 382/141, 132, 149, 294; 600/407, 504, 2.1; 250/581; 378/98.2

(56) References Cited

U.S. PATENT DOCUMENTS

| | | | |
|---|---|---|---|
| 5,164,831 A | | 11/1992 | Kuchta et al. |
| 5,288,977 A | * | 2/1994 | Amendolia et al. ......... 235/375 |
| 5,319,719 A | * | 6/1994 | Nakazawa et al. .......... 382/132 |
| 5,553,277 A | | 9/1996 | Hirano et al. |
| 5,592,374 A | * | 1/1997 | Fellegara et al. ........ 128/653.1 |
| 5,740,801 A | * | 4/1998 | Branson .................. 128/653.1 |
| 5,779,634 A | * | 7/1998 | Ema et al. .................. 600/407 |
| 5,796,802 A | * | 8/1998 | Gordon .......................... 378/8 |
| 5,933,137 A | | 8/1999 | Anderson |
| 5,982,953 A | * | 11/1999 | Yanagita et al. ............ 382/294 |
| 6,006,231 A | * | 12/1999 | Popa ........................... 707/101 |
| 6,032,120 A | * | 2/2000 | Rock .............................. 705/2 |
| 6,078,925 A | * | 6/2000 | Anderson et al. ........... 707/103 |
| 6,157,373 A | * | 12/2000 | Rego ............................ 345/173 |
| 6,169,817 B1 | * | 1/2001 | Parker et al. ............... 382/131 |
| 6,178,225 B1 | * | 1/2001 | Zur et al. ................... 378/98.2 |
| 6,246,787 B1 | * | 6/2001 | Hennessey et al. ......... 382/141 |
| 6,269,379 B1 | * | 7/2001 | Hiyama et al. ............. 707/104 |
| 6,272,470 B1 | * | 8/2001 | Teshima ........................ 705/3 |
| 6,292,582 B1 | * | 9/2001 | Lin et al. .................... 382/149 |
| 6,359,628 B1 | * | 3/2002 | Buytaert ..................... 345/419 |
| 6,369,812 B1 | * | 4/2002 | Iyriboz et al. .............. 345/419 |

FOREIGN PATENT DOCUMENTS

| | | |
|---|---|---|
| EP | 0 327 931 A2 | 8/1989 |
| WO | WO 91/14334 | 9/1991 |

OTHER PUBLICATIONS

Kurzidim, M., "Bildersafari," *c't*, Heft 9, 1994, pp. 112–121.

* cited by examiner

*Primary Examiner*—Matthew C. Bella
*Assistant Examiner*—Wesner Sajous
(74) *Attorney, Agent, or Firm*—Venable LLP; Julie A. Petruzzelli; Jeffrey W. Gluck, Ph.D.

(57) ABSTRACT

A method for image management of X-ray images stores the images in files along with reduced-size versions of the images and additional information relating to the images. A user may preview each image in a reduced-size display, based on the reduced-size image, which preview may also include the additional information. The image may then be selected from the display for complete display of the original image.

17 Claims, 2 Drawing Sheets

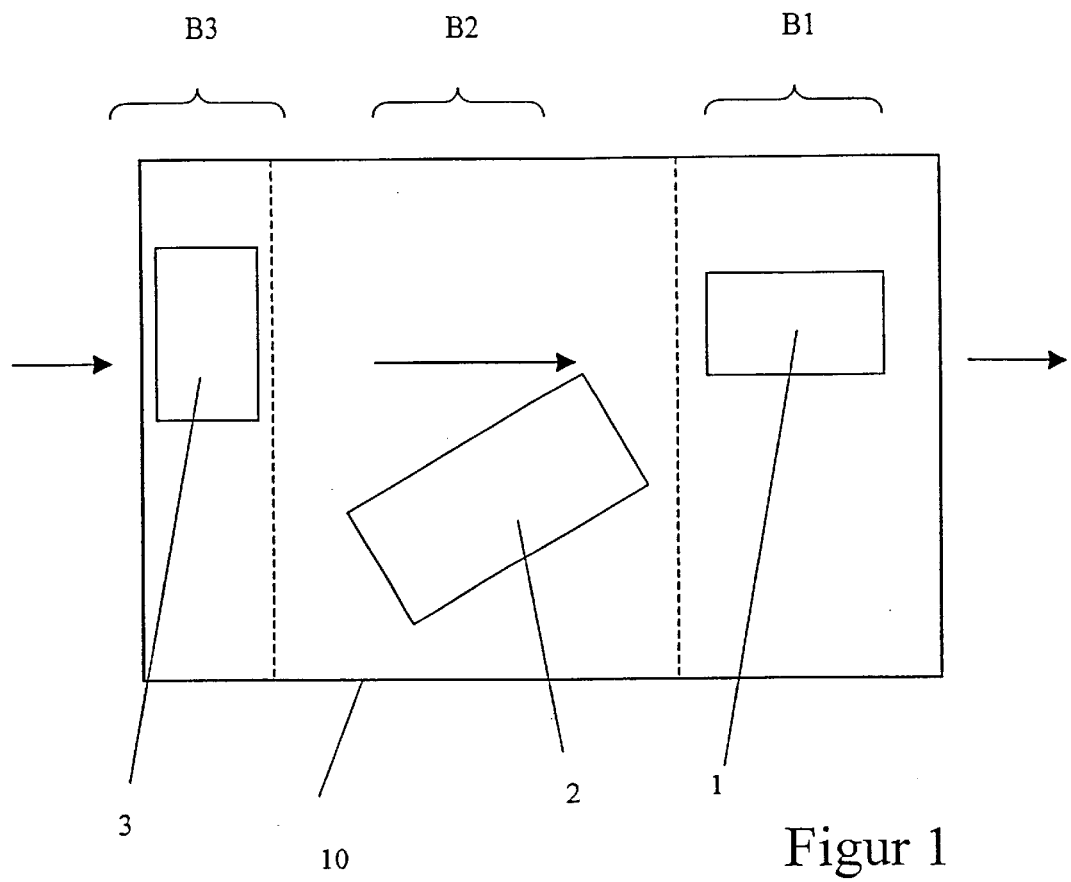
Figur 1
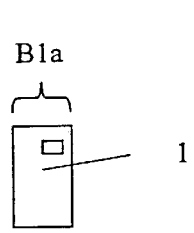
Figur 2
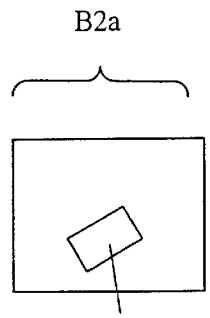
Figur 3

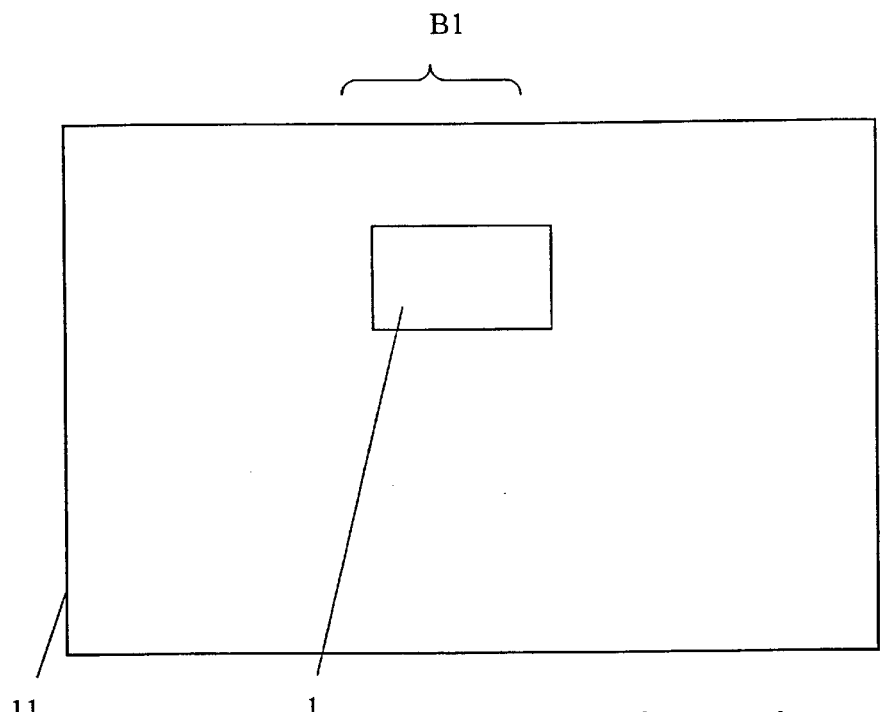
Figur 4
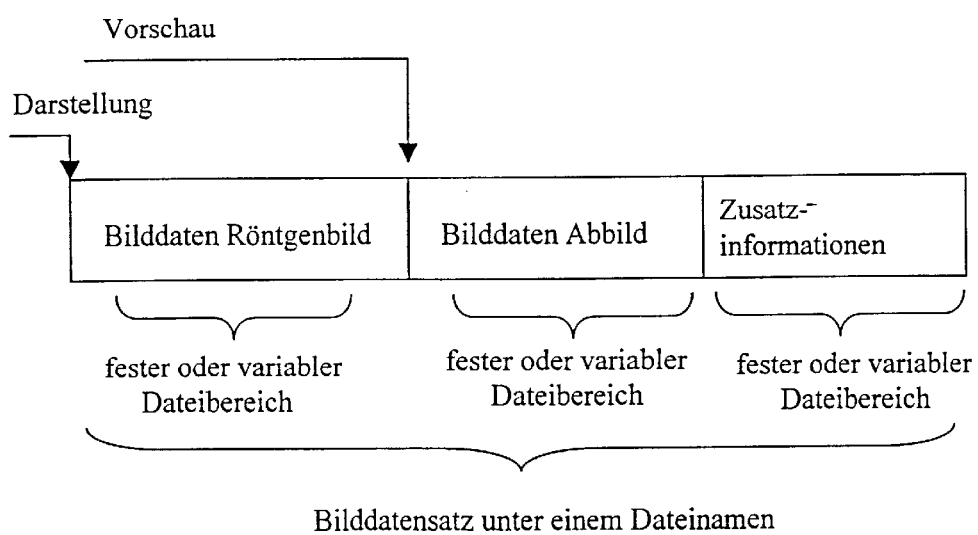
Figur 5

METHOD FOR IMAGE MANAGEMENT OF X-RAY IMAGES

FIELD OF THE INVENTION

The invention relates to a method for image management of X-ray images.

BACKGROUND OF THE INVENTION

Because it is necessary, for example in security checks in airports, to also be able to inspect X-ray images at a later time, the images are stored under a file name in a computer. Particularly in X-ray machines, the computer automatically assigns file names, because a manual assignment of file names is impossible due to the high baggage throughput in an X-ray machine.

A disadvantage of this is that the stored X-ray images can only be called up quickly if the automatically-generated file name is known.

A graphic assignment of file names and files in a preview presentation is known from computer technology. In the graphic versions, the image appears as a size-reduced, scarcely recognizable version of the original. The file name is assigned through a user input. Only the original image is stored. The image is only stored temporarily and is displayed with a time delay when the user clicks on the file name in the overview in the open mode.

Image-encoding methods and devices, as well as image-processing methods and devices, are known in numerous embodiments.

The unpublished German Patent Application DE 198 55 250.5 describes a method of optimizing an X-ray image.

SUMMARY OF THE INVENTION

It is the object of the invention to provide an image-management method for X-ray images, with which the desired X-ray image can be retrieved better and faster.

The object is accomplished by the inventive method for image management of X-ray images generated when objects are scanned. The images are stored in an image file under a predetermined file name. A reduced image of each image is stored in an image file along with the original image. Information about the image may also be stored. When a predetermined file name is entered, the reduced image is displayed as a preview, which aids in searching for a desired image.

The concept underlying the invention is to present a preview of an image that corresponds to a stored X-ray image, but is on a reduced scale, when a file name is selected; the reduced preview image can also be in color. Additional information, such as the storage date, time, operator name, etc., can also be displayed on a surface that is preferably outside of the graphic display. For this purpose, the file name is automatically generated when the image data are stored, and the reduced image and the original of the X-ray image and the additional information are stored in an image file. For the preview, the image manager only retrieves the reduced image and the additional information in the image file. Only when a complete display is requested is the entire image displayed, in which case the reduced image (thumbnail) is not displayed. The additional information is generated in the system, for example, through inquiry modes and system information. This additional information can also be used to implement special search programs. In this instance, a crude, but targeted limitation of the searched or observed X-ray images can be stipulated prior to the image presentation.

The fact that a small image of the original, in addition to the file name of the image file, is available during the search facilitates the image management for the user.

The parallel placement of the images into an image file offers the additional advantage that the image is constructed very quickly, so the user can partially scroll through the image list. The reduced image only requires a small storage capacity.

BRIEF DESCRIPTION OF THE DRAWINGS

The invention is described in detail by way of an embodiment illustrated in the drawings, in which:

FIG. 1 shows a schematic representation of an image recording;

FIG. 2 shows a reduced image of the first X-ray image from FIG. 1;

FIG. 3 shows a reduced image of the second X-ray image from FIG. 1;

FIG. 4 shows a display of the first stored X-ray image from FIG. 1; and

FIG. 5 shows a schematic representation of a stored image file.

DETAILED DESCRIPTION OF THE INVENTION

FIG. 1 is a schematic representation of a monitor image 10 with X-ray images B1, B2, B3, etc., of objects 1, 2, 3, etc., that are to be displayed, the objects being located on a transport belt, not shown in detail. These X-ray images B1, B2, B3, are generated by the scanning of the objects 1, 2, 3. The X-ray images B1, B2, B3, etc., typically arrive consecutively and object-dependently on the monitor image 10, and can be shown without color, as half-tone images, or in color.

If, as in the present example, a plurality of X-ray images B1, B2, B3 or only one X-ray image B1 is being shown on the monitor image 10, a file assignment is effected based on the object. Therefore, not all objects 1, 2, 3, etc., which can be seen simultaneously on the monitor 10, are stored in an image file with the associated file name; instead, each X-ray image B1, B2, B3, etc., is stored individually. As the X-ray images B1, B2, B3 enter, the X-ray image B1, B2, B3, etc., that entered last is stored, or all of the X-ray images B1, B2, B3, etc., that are visible in the monitor image 10 are stored simultaneously. The system prevents an overlapping of the image storage, that is, the assignment of two file names to one X-ray image B1, B2, B3, etc. A free space that can be seen between the objects 1, 2, 3, etc., is utilized; namely, the space is recognized by the computer as a gap, and therefore divides the objects 1, 2, 3, etc., appearing on the monitor image 10 into a plurality of X-ray images B1, B2, B3, etc., assigned to the respective objects 1, 2, 3, etc. These images are then stored.

As the X-ray images B1, B2 and B3 are being stored, the respective X-ray image B1, B2, B3 to be stored is simultaneously reduced to a corresponding image B1a, B2a, B3a, whose image data are stored in the same image-data file of the respective X-ray image B1, B2, B3, along with additional information, and are thus assigned the same file name. The additional information includes, for example, the storage date and time of the stored X-ray image, the user of the X-ray machine, the device and/or serial number, and other information that can be predetermined through an inquiry mode and facilitates search and management of the X-ray images B1, B2, B2, etc.

FIGS. 2 and 3 illustrate a reduced image B1a, B2a of this type.

The reduction is preferably effected proportionally to the respective X-ray image B1, B2 or B3 to ensure that the image will be recognizable again in the reduced images of the preview. An operator can easily see from the preview whether the object, for example, is a suitcase or a bag. If a suitcase is being searched, therefore, this bag is eliminated in the later viewing. The image B1a, B2a, B3a for the object 1, 2, 3 or the monitor image 10 is reduced in all dimensions to about ¼, so the image is reduced to about ¹⁄₁₆ of the original image. This means that only every $16^{th}$ pixel for the image B1a, B2a or B3a is written into the image file.

FIG. 5 illustrates a general structure of an image file as a set of image data originating from the image data of the original X-ray image B1, B2 or B3, the image data of the reduced images B1a, B2a, B3a and the additional information. For this purpose, the image data B1, B2, B3, their reduced images B1a, B2a, B3a and the additional information are recorded in a fixed, pre-defined section in the image file, or are respectively allocated to a region that can be accessed quickly. It is also possible, however, to organize the image file in the manner of a directory structure or in the form of a chained list.

In the fixedly-defined sections recording scheme, the X-ray images B1, B2, B3, etc., and their reduced images B1a, B2a, B3a, etc., and additional information are recorded (first) starting only with a predetermined file region, and are then stored in a fixed, pre-defined data region.

In contrast, storage capacity is saved in the alternative region allocation. Depending on the size, and therefore the number of pixels, only the data region of the image file that is required for storing the aforementioned data, such as X-ray image, reduced image and additional information, is used.

The general processing of the X-ray images B1, B2, B3 into storable image pixels is effected in a known manner.

In the so-called open mode, the file names are presented in a known manner as a list or tree structure. In the open mode, the respective reduced image B1a, B2a, B3a appears, as a so-called thumbnail, along with the additional information, when a file name is selected. Consequently, the user can scroll through the list or tree structure very quickly, because the image is present in stored form and need not be additionally calculated and temporarily generated.

For a complete display of the searched X-ray image B1, B2 or B3, the image is selected from the list and displayed on a separate monitor 11, for example. FIG. 4 illustrates an X-ray image that is displayed in this manner. For displaying the respective X-ray image B1, B2 or B3, only the image data are read out of the image-data file. During the retrieval of the images, this X-ray image B1, B2 or B3 then appears on the monitor 11.

The computer assigns or presets the file name through an automatic number assignment, which is generated, for example, by the counting of the objects 1, 2, 3 entering the machine.

It is also possible, however, to implement a software conversion algorithm to take into account data from the additional information in the assignment or presetting of the file name.

For objects 1, 2, 3, etc., the file name can also be assigned or preset as a function of a code if the objects 1, 2, 3 are provided with codes, such as barcodes, on tags attached to the objects 1, 2, 3. For this purpose, the algorithm for the file-name assignment is changed with the use of software such that the code that is read in determines the file name. This code can be specific, for example, for a flight or person, assuring a better management of file names based on the flight number, as well as an allocation of the object 1, 2, 3 to a specific person.

For uncoded baggage, which might include, for example, hand-held baggage, in contrast, the file name can be assigned according to time and/or date, which is also possible for coded objects 1, 2, 3.

The invention has been described in detail with respect to preferred embodiments, and it will now be apparent from the foregoing to those skilled in the art that changes and modifications may be made without departing from the invention in its broader aspects. The invention, therefore, as defined in the appended claims, is intended to cover all such changes and modifications as fall within the true spirit of the invention.

What is claimed is:

1. A method for image management of X-ray images comprising the steps of:

scanning a sequence of objects to produce X-ray images;
 processing the X-ray images to produce a sequence of X-ray images, each corresponding to one of said sequence of objects;
 storing each of said images corresponding to one of said objects to an image file having a predetermined file name, which step comprises the sub-step of:
  generating and storing, along with the respective X-ray image, a reduced-size version of the image; and
  displaying the respective reduced-size version of the image in a preview when the predetermined file name is selected,
 wherein said predetermined file name is determined based on a specific code of an object.

2. The method according to claim 1, wherein said step of storing further comprises the step of storing additional information about the respective X-ray image in the image file along with the X-ray image and its reduced-size image; and wherein said step of displaying includes the step of displaying said additional information in said preview when the predetermined file name is selected.

3. The method according to claim 2, wherein said step of displaying further comprises the step of:

using a search program, specifying only a limited subset of images for preview based on information input to the search program corresponding to said additional information.

4. The method according to claim 1, wherein the step of generating and storing comprises the step of:

generating said reduced-size image from an X-ray image by reducing the X-ray proportionally and in all of its dimensions.

5. The method according to claim 1, wherein the step of generating and storing comprises the step of:

storing the size of an X-ray image on an object-specific basis.

6. The method according to claim 1, wherein said predetermined file name is determined as a function of date and time.

7. The method according to claim 1, further comprising the steps of:

reading a code associated with an object to be scanned; and determining a file name based on said code.

8. The method according to claim 7, wherein said code is a barcode on a tag on said object to be scanned, and said step of reading a code comprises the step of reading the barcode.

9. The method according to claim 1, wherein said predetermined file name is determined as a function of date.

10. The method according to claim 1, wherein said predetermined file name is determined as a function of time.

11. The method according to claim 1, wherein said predetermined file name is assigned automatically on an object-by-object basis.

12. The method of claim 1, further comprising the step of:
displaying the file names corresponding to said images in one of a list and a tree structure.

13. A method for image management of X-ray images comprising the steps of:

scanning objects to produce a sequence of X-ray images;

storing each of said images to an image file having an automatically determined file name, which step comprises the sub-steps of:
automatically determining separate X-ray images according to gaps between the scanned objects;
automatically assigning a file name for each separate X-ray image; and
generating and storing, along with the respective X-ray image, a reduced-size version of the image; and
displaying the respective reduced-size version of the image in a preview when the automatically assigned file name is selected.

14. The method according to claim 13, wherein said step of automatically determining separate X-ray images according to gaps between the scanned objects comprises the step of:

determining a separate X-ray image as the image between two gaps.

15. A method for image management of X-ray images comprising the steps of:

scanning objects to produce X-ray images;

detecting gaps between said objects in said X-ray images to produce a sequence of X-ray images corresponding to said objects;

storing each of said X-ray images corresponding to an object to an image file having a predetermined file name, which step comprises the sub-step of:
generating and storing, along with the respective X-ray image, a reduced-size version of the image; and
displaying the respective reduced-size version of the image in a preview when the predetermined file name is selected.

16. The method according to claim 15, wherein said step of detecting gaps between said objects to produce a sequence of X-ray images further comprises the steps of:

determining each X-ray image to be a portion of the sequence located between two consecutive gaps.

17. A method of performing X-ray screening of baggage, comprising the steps of:

providing objects, the objects comprising baggage, for X-ray screening; and executing the method for image management of X-ray images according to claim 15.

* * * * *